United States Patent [19]

Ohta et al.

[11] Patent Number: 4,837,130
[45] Date of Patent: Jun. 6, 1989

[54] OPTICAL DISK MANUFACTURING METHOD

[75] Inventors: Minemasa Ohta; Kenji Suzuki; Satoru Fukuoka; Toshihiko Takishita; Tuyoshi Hayashi, all of Yamanashi, Japan

[73] Assignees: Pioneer Electronic Corp.; Pioneer Video Corporation, both of Japan

[21] Appl. No.: 89,894

[22] Filed: Aug. 27, 1987

[30] Foreign Application Priority Data

Aug. 27, 1986 [JP] Japan .................................. 61-202317

[51] Int. Cl.[4] .............................................. G03C 5/16
[52] U.S. Cl. ..................................... 430/321; 430/312; 430/323; 430/394; 430/945; 369/284; 369/288
[58] Field of Search ............... 430/312, 322, 394, 945, 430/909, 323, 273, 321, 330; 346/766; 369/275, 277, 284, 285, 286, 288

[56] References Cited

U.S. PATENT DOCUMENTS

| | | | |
|---|---|---|---|
| 3,982,943 | 9/1976 | Feng et al. | 430/329 X |
| 4,109,045 | 8/1978 | Goshima et al. | 428/212 |
| 4,732,844 | 3/1988 | Ota et al. | 430/322 |

OTHER PUBLICATIONS

Kaplan et al., "Two and Three-Layer Photoresist Technique", IBM Tech. Disc. Bull. vol. 15, No. 7, Dec. 1972, pp. 2339-1240.

Primary Examiner—José G. Dees
Attorney, Agent, or Firm—Sughrue, Mion, Zinn, Macpeak & Seas

[57] ABSTRACT

In an optical disk manufacturing method in which a first photo resist layer, an intermediate resin layer, and a second photo resist layer are formed on a substrate in the stated order, a resin solution which is unsoluble in organic solvent is applied to the first photo resist layer, heated, and hardened to form the intermediate resin layer. Thereby the use of a large, expensive device such as a vacuum deposition device or sputting device is eliminated.

6 Claims, 4 Drawing Sheets

OPTICAL DISK MANUFACTURING METHOD

BACKGROUND OF THE INVENTION

1. Field of the Invention

This invention relates to a method of manufacturing an optical disk.

2. Background of the Invention

An after-recording type of optical disk having a structure as shown in FIG. 1 is known in the art. More specifically, the optical disk, as shown in FIG. 1, comprises a substrate 11, a data recording layer 12 formed on the substrate 11, and a protective board 15. The protective board 15 is bonded through a spacer 13 to the substrate 11 in such a manner that a space 14 is formed between the protective board 15 and the data recording layer 12.

Part (a) of FIG. 2 is an enlarged sectional view showing a part of FIG. 1 which is defined by the circle X in FIG. 1. Preaddress pits 111 and a guide groove 112 are coaxially juxtaposed on the transparent substrate 11. The data recording layer 12 which contains, for instance, organic pigment is formed over the preaddress pits 111 and the guide groove 112. Part (b) of FIG. 2 is a front view of the substrate 11 as viewed from the laser beam application side, corresponding to part (a) of FIG. 2. As is apparent from FIG. 2, a preaddress pit region PA and a guide groove region PG are formed on the substrate 11 in advance. A laser beam is then used to make holes in the data recording layer 12 on the guide groove region PG so that data are additionally recorded in the form of pits 113.

In general, in the substrate of this after-recording type at optical disk, the depth of the preaddress pits 111 is set to $\lambda/4n$ (where $\lambda$ is the wavelength of a laser beam used, and n is the refractive index of the substrate 11) so as to maximize the contrast of the laser beam reflected therefrom. The depth of the guide groove 112 is set to $\lambda/8n$ so as to maximize a tracking signal.

The above-described substrate having the guide groove and the preaddress pits is produced on a large scale as follows. First, a photo resist layer is formed on a circular glass plate which is a recording original board. Then the photo resist layer thus formed is selectively exposed to a laser beam and is developed to form a mother die. The mother die thus formed is utilized to form a metal stamper of Ni or the like. The metal stamper is used for a mass production of the substrate of PMMA or the like.

It is essential that the substrate thus formed is accurate in configuration. More specifically, in the substrate, the bottoms of the preaddress pits and the guide groove should not be rounded. For this purpose, in a method of forming the mother die for the stamper, as shown in FIG. 3, a first photo resist layer 2 and a second photo resist layer 3 are formed on the glass plate 1 by coating the glass plate 1 with two kinds of photo resist of different spectral sensitivity from each other, without forming an intermediate layer therebetween. Then, the photo resist layers are selectively exposed to a laser beam. In the method, the solvents of the two kinds of photo resist are different. Therefore, it is an absolute condition that the solvent of the second photo resist layer 3 will never affect the first photo resist layer 2. Accordingly, in the method, the range of selection of the photo resist is greatly limited.

This difficulty has been eliminated by a method disclosed by Japanese Patent Application No. 23010/1984. In the method, as shown in FIG. 4, an intermediate layer 4 of nonorganic material such as silicon oxide which will not be decomposed by the solvent is provided between the first and second photo resist layers 2 and 3.

In the method, the intermediate layer 4 of silicon oxide is an SiO or $SiO_2$ film. Therefore the formation of the intermediate layer 4 needs a large, expensive device such as a vacuum deposition device or a sputtering device.

SUMMARY OF THE INVENTION

Accordingly, an object of this invention is to eliminate the above-described difficulties accompanying a conventional optical disk manufacturing method.

More specifically, an object of the invention is to provide a method of manufacturing an optical disk with a guide groove in which the depth and width of the guide groove and the preaddress pits can be freely and accurately determined.

The foregoing object and other objects of the invention have been achieved by the provision of a method of manufacturing an optical disk having pits different in depth. The method begins with a step of forming a first photo resist layer on a recording original board. In an intermediate resin layer forming step, an intermediate resin layer is formed on the first photo resist layer. Then, a second photo resist layer is formed on the intermediate resin layer which is different in spectral sensitivity from the first photo resist layer. The first and second photo resist layers are selectively exposed to light beams having wavelengths corresponding respectively to the first and second photo resist layers. The photo resist layers are developed and the recording layer is etched. According to the invention, in the intermediate resin layer forming step, an organic-solvent insoluble resin solution is applied to the first photo resist layer, heated, and hardened to form the intermediate resin layer.

The nature, principle and utility of the invention will become more apparent from the following detailed description and the appended claims when read in conjunction with the accompanying drawings, in which like parts are designated by like reference numerals.

DETAILED DESCRIPTION OF THE INVENTION

An optical disk manufacturing method according to this invention will be described with reference to FIGS. 5A.

Figure 1:
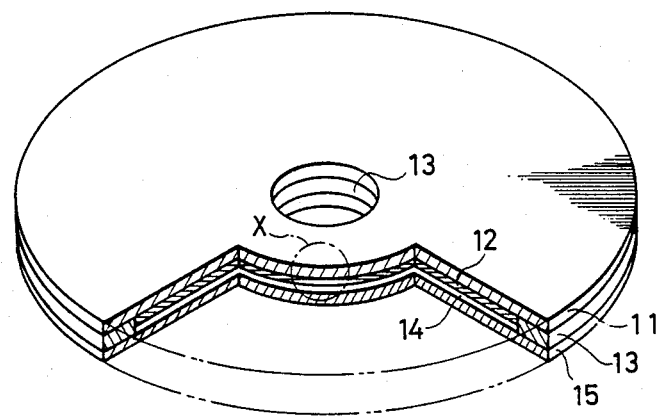
FIG. 1 is a perspective view, with parts cut away showing an after-recording type optical disk.
Figure 2:
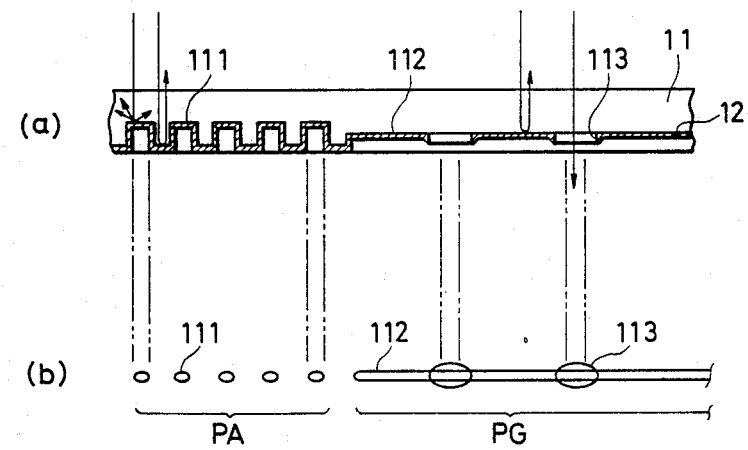
FIG. 2 is an explanatory diagram for a description of the after-recording type optical disk.
Figure 3:
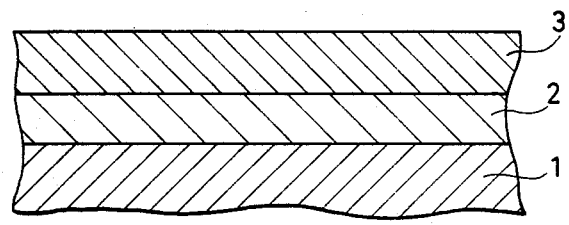
FIGS. 3 and 4 are sectional diagrams for a description of conventional optical disk manufacturing methods.
Figure 4:
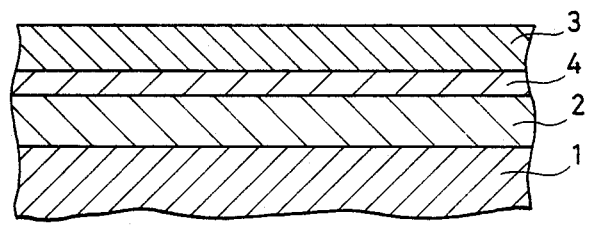
Figure 5A:
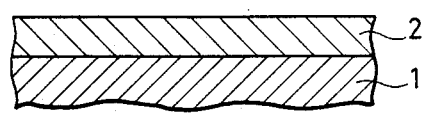
FIGS. 5A through 5G are sectional diagram for a description of a method of manufacturing an optical disk according to this invention.

As shown in FIG. 5A, a glass plate 1 is prepared which has been surface polished and washed. A first photo resist layer 2 is formed on the glass plate 1 according to a method in which a photo resist is mixed with organic solvent and the resulting mixture is applied to the glass plate according to the spin coat method and dried. This photo resist may be for instance the photo resist AZ5214 manufactured by Hext (phonetic) Co., whose spectral sensitivity is in the range of short wavelengths.

Figure 5E:
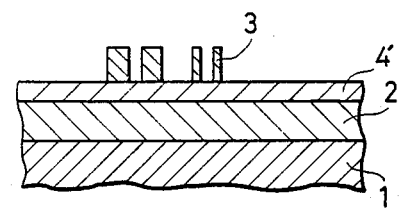
Figure 5B:
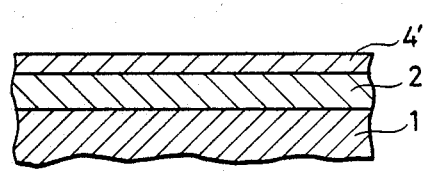

Under this condition, as shown in FIG. 5B, a polyvinyl alcohol solution having a concentration of 10 g/l is applied to the first photo resist layer 2 by the spin coat method and is then subjected to baking. That is, it is heated and dried to thereby form a transparent intermediate resin layer 4' 20 nm to 30 nm in film thickness. This intermediate resin layer 4' is insoluble with organic solvents. The film thickness of the intermediate resin layer 4' is determined by the shake-off speed of the spinner rotating the glass plate and by the density of the polyvinyl alcohol solution.

Figure 5F:
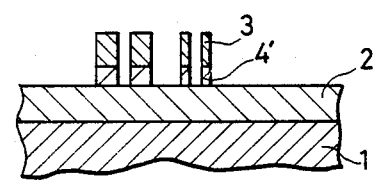
Figure 5C:
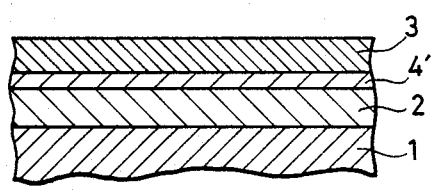

Next, as shown in FIG. 5C, a second photo resist layer 3 is formed on the intermediate resin layer 4' using a method in which a photo resist is suitably mixed with organic solvent and the resultant solution is applied to the intermediate resin layer 4' using the spin coat method and dried. This second photo resist may be, for example, the photo resist AZ1350 manufactured by Hext (phonetic) Co., whose spectral sensitivity is in the range of long wavelengths. Thus, the first photo resist layer 2, the intermediate resin layer 4', and the second photo resist layer 3 have been formed on the glass plate 1 in the stated order.

Figure 5G:
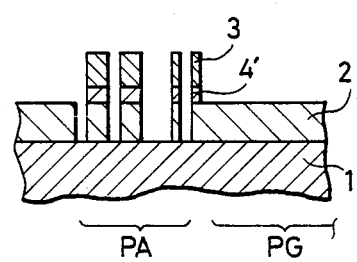
Figure 5D:
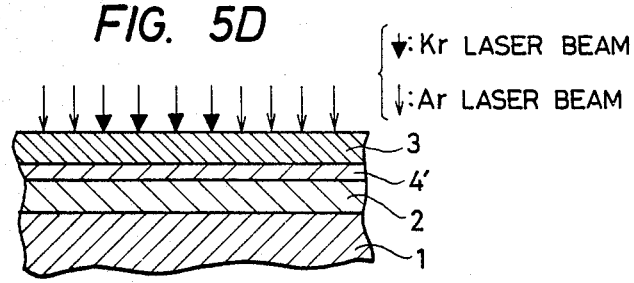
Figure 7:
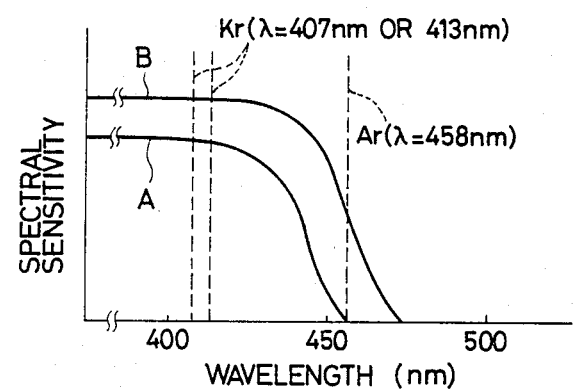
FIG. 7 is a graphical representation indicating the spectral sensitivity curves of two kinds of photo resist employed in one embodiment of this invention.

As shown in FIG. 5D, the first and second photo resist layers 2 and 3 are selectively exposed to laser beams, such as a Kr laser beam and an Ar laser beam, which correspond in wavelength to the two kinds of photo resist layers 2 and 3. The laser beam wavelengths vs. spectral sensitivity curves of the first and second photo resist layers 2 and 3 are as indicated in FIG. 7. More specifically, in FIG. 7, curve A is the spectral sensitivity curve of the first photo resist layer 2 and curve B is the spectral sensitivity curve of the second photo resist layer 3. The Ar laser beam ($\lambda=458$ nm) supplies a long wavelength laser beam, and the Kr laser beam ($\lambda=407$ nm or 413 nm) supplies a short wavelength laser beam. The Ar laser beam is used to form the guide groove, and the Kr laser beam is used to form the preaddress pits. In this operation, the second photo resist layer 3 is exposed both to the Kr laser beam and to the Ar laser beam, but the first photo resist layer 2 is exposed only to the Kr laser beam. In the exposure, the solubility of the parts of the photo resist layers exposed to the laser beams depends on a photodissociation reaction.

The thus exposed recording original board is developed, as a result of which, as shown in FIG. 5E, the exposed parts of the second photo resist layer 3 are removed.

Next, with the remaining part of the second photo resist layer 3 as a mask, an alkaline solution is applied to the intermediate resin layer 4' which is alkalisoluble, in order to etch the resin layer 4', as shown in FIG. 5F. As a result, the depth of the parts which will be the guide groove and the preaddress pits is increased as much as the thickness of the intermediate resin layer 4'.

The board thus treated is again subjected to developing. As a result, as shown in FIG. 5G, only the parts of the first photo resist layer 2 which have been exposed to the Kr laser beam so as to form the preaddress pits are removed so that the depth of the preaddress pits is made larger than that of the guide groove. As shown in FIG. 5G, the depth of the preaddress pits is larger than the thickness of the guide groove by an amount which is equal to the thickness of the first photo resist layer 2. Thus, there has been formed the mother die for the stamper for forming a substrate having preaddress pits and a guide groove different in depth.

Thereafter, the stamper is formed by using the mother die, and an optical disk, having preaddress pits and guide groove regions is manufactured, according to the conventional method.

In the method of the invention, the intermediate resin layer 4' is provided as a separating film which, when the second photo resist layer 3 is formed over the first photo resist layer 2, prevents the first photo resist layer 2 from being dissolved by the organic solvent of the second photo resist layer 3.

The optical transmission characteristic of the intermediate resin layer 4' should be such that, when the laser beams for forming the guide groove region and the preaddress pit region are applied to the recording original board, the laser beam passed through the second photo resist layer 3 can sufficiently reach the first photo resist layer 2. In the above described embodiment, a polyvinyl alcohol solution is employed to form the intermediate resin layer 4'. However, polymers such as polyacrylic amide and methyl cellulose may alternatively be used. These polymers are water-soluble. Therefore, application of the resin solution according to the spin coat method can readily provide a thin film. These polymers have low solubility with water at room temperature. That is, they are not readily dissolved in water at room temperature. However, they can be disolved in an alkaline aqueous solution and can be readily dissolved in water at temperatures higher than about 30° C. In addition, the polymers are insoluble with the solvent which is used for forming the second photo resist layer 3 on the intermediate resin layer 4'.

After the intermediate resin layer 4' is formed as shown FIG. 5B, it is heated and dried by baking to thereby harden the resin layer 4'. Changing the baking temperature can control the time required for etching the intermediate resin layer 4'.

Figure 6:
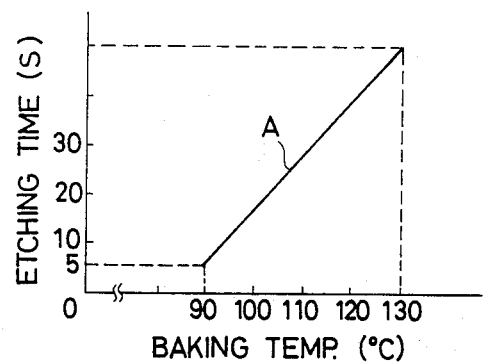
FIG. 6 is graphical representing indicating baking temperature with etching time in the case where an intermediate resin layer is etched with alkaline solution.

FIG. 6 is a graphical representation indicating baking temperature with etching time in the case where the intermediate resin solution 4' 20 nm to 30 nm in thickness is etched with the alkaline solution. In FIG. 6, curve A indicates the variation of the time required for etching the intermediate resin layer 4' with the alkaline solution. As is apparent from FIG. 6, the higher the baking temperature, the longer the etching time. When the baking temperature is in a range of from 90° C. to 130° C., the etching time is in a range of from 5 sec. to 50 sec. This baking temperature range is practical. That is, if the baking temperature is higher than that range, the sensitivity of the first photo resist layer 2 formed is lowered so that a positive optical exposure cannot be achieved. If the baking temperature is lower, then during the etching operation of FIG. 6 the intermediate resin layer 4' is quickly melted. That is, it is excessively removed with the result that the pits formed are inaccurate in configuration, and accordingly it is impossible to form the stamper with high accuracy. It has been confirmed that the most suitable baking temperature is in a range of from 100° C. to 110° C.

Figure 8:
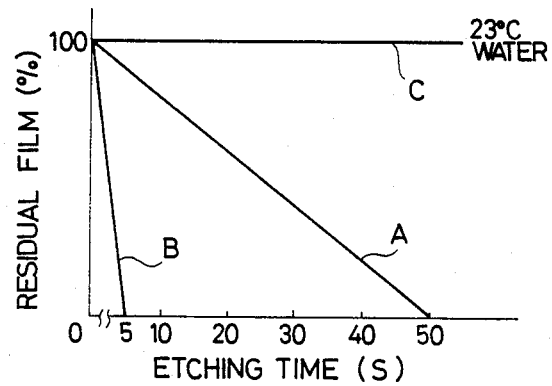
FIG. 8 is a graphical representation indicating the residual film percentage with etching time in the case where the intermediate resin layer is etched with alkaline solution.

FIG. 8 is a graphical representation indicating etching time with residual film percentage in the case where the intermediate resin layer 4' 20 nm to 30 nm in thickness in the embodiment is etched with alkaline solution. In FIG. 8, curve A indicates the residual film percentage as a function of the period of etching time at a baking temperature of 130° C. Curve B indicates the residual film percentage with etching time at a baking temperature of 90° C. Depending on the concentration and temperature of the alkaline solution, the residual film percentage of the intermediate resin layer 4' can be controlled to some extent by changing the etching time period. Thus, the configuration of the guide groove and the preaddress pits can be adjusted by controlling the baking temperature and the etching time.

In the above-described embodiment, the first and second photo resist layers 2 and 3 use a positive photo resist which contains phenol novolak resin and quinone diazide ester as photosensitive material. However, a negative photo resist may be used to form the first and second photo resist layers.

The intermediate resin layer is soluble in alkaline solution. Therefore, when the exposed parts of the first and second photo resist layers 2 and 3 are removed with one and the same alkaline developing solution, then the developing operation can be achieved with only one kind of developing solution. Therefore the manufacturing process is simplified as much.

The intermediate resin layer is water-soluble. However, it is scarcely dissolved in water at temperatures of the order of room temperature. Nonetheless, it has been found that, when the water temperature is in a range of from 30° C. to 80° C., the intermediate resin layer can be etched. In other words, it has been confirmed that, when the intermediate resin layer 4' of 20 to 30 nm in thickness is subjected to etching with water at these temperatures, it can be etched substantially in the same manner as it is etched with the alkaline solution. The reason why the upper limit of the temperature range in the etching operation with the water is 80° C. is that, if the temperature is higher than 80° C., then the two kinds of photo resist layers will peel off. The reason why the lower limit of the temperature range is set to 30° C. is that, if the temperature is lower than 30° C., then the etching operation is not carried out because of the low solubility of the intermediate resin layer. For the purpose of comparison, FIG. 8 shows the curve C which indicates residual film percentage with etching time in the case where the etching operation is carried out with water at a temperature of 23° C. As is apparent from the curve C, it is substantially impossible to perform the etching operation with this temperature of water.

Thus, in the case where the etching operation is carried out with water at temperatures in a range of 30° C. to 80° C. as described above, the developing operation in which different developing solutions are used for different photo resist materials can be readily and positively achieved.

After the etching operation with water or alkaline solution, the etched layers are washed in an ordinary washing operation. In the washing, the intermediate resin layer exposed in the preaddress pits and the guide groove which are formed on the glass plate is not decomposed by the washing water. Thus, the preaddress pits and the guide groove are accurate in configuration. These results arise because at temperatures of the order of room temperature the polymer of the intermediate resin layer is low in solubility and the heating temperature can be controlled during the intermediate resin layer forming operation.

As was described above, the intermediate resin layer of the optical disk according to the invention is composed of resin. The solution-state resin is applied to the first photo resist layer, dried, and hardened to form the intermediate resin layer. That is, the thin film can be readily formed on the first photo resist layer, for instance, by the spin coat method. Therefore, it is unnecessary to use a large, expensive vacuum deposition device or sputtering device.

According to the invention, two kinds of photo resist layers of different spectral sensitivity are formed on both sides of the intermediate resin layer made of the resin which is unsoluble in organic solvent. The photo resist layers are separately exposed to light and developed to remove their parts. Therefore, the formation of the photo resist layers can use more kinds of photo resist than in the conventional optical disk. Thus, in the method of the invention, the depth and width of the guide groove and the preaddress pits can be freely and accurately determined.

What is claimed is:

1. A method of manufacturing an optical disk having pits different in depth, comprising the steps of:
   forming a first photo resist layer on a recording original board;
   forming an intermediate resin layer on said first photo resist layer;
   forming a second photo resist layer which is different in spectral sensitivity from said first photo resist layer;
   selectively exposing said first and second photo resist layers to light beams having wavelengths corresponding respectively to said first and second photo resist layers;
   developing said second photo resist layer; and
   etching said intermediate resin layer;
   wherein said step of forming said intermediate resin layer comprises applying a resin solution which is soluble with water and which is insoluble with organic solvents to said first photo resist layer, heating said applied resin solution, sand hardening said heated resin solution to form said intermediate resin layer.

2. A method as claimed in claim 1, wherein said etching step includes exposing said intermediate resin layer to water in a temperature range of 30° C. to 80° C.

3. A method as claimed in claim !, in which said intermediate resin layer is of one selected from the group consisting of polyvinyl alcohol, polyacrylic amide and methyl cellulose resins.

4. A method as claimed in claim 1, further comprising developing said first photo resist layer after said etching step.

5. A method as claimed in claim 4, further comprising forming a stamper from said recording original board having said developed first and second photo resist layers and said etched intermediate resin layer, and stamping a substrate with said stamper.

6. A method of manufacturing an optical disk having pits different in depth, comprising the steps of:
   forming a first photo resist layer on a recording original board;
   forming an intermediate resin layer on said first photo resist layer;
   forming a second photo resist layer which is different in spectral sensitivity from said first photo resist layer;
   selectively exposing said first and second photo resist layers to light beams having wavelengths corresponding respectively to said first and second photo resist layers;
   developing said second photo resist layer; and
   etching said intermediate resin layer;
   wherein said step of forming said intermediate resin layer comprises applying a resin solution which is soluble with an alkali and which is insoluble with organic solvents to said first photo resist layer, heating said applied resin solution, and hardening said heated resin solution to form said intermediate resin layer.

* * * * *